(12) United States Patent
Kemppinen (10) Patent No.: US 7,123,240 B2
(45) Date of Patent: Oct. 17, 2006

(54) MOBILE TERMINAL WITH JOYSTICK

(75) Inventor: Pasi Kemppinen, Tampere (FI)

(73) Assignee: Nokia Corporation, Espoo (FI)

( * ) Notice: Subject to any disclaimer, the term of this patent is extended or adjusted under 35 U.S.C. 154(b) by 391 days.

(21) Appl. No.: 10/436,636

(22) Filed: May 13, 2003

(65) Prior Publication Data

US 2004/0227732 A1 Nov. 18, 2004

(51) Int. Cl.
*G09G 5/08* (2006.01)

(52) U.S. Cl. ............... 345/161; 455/575.3; 200/5 R (58) Field of Classification Search ............... 345/161, 345/169; 455/575.3; 200/6 A, 65 R, 5 R; 273/148 B; 74/471 XY
See application file for complete search history.

(56) References Cited

U.S. PATENT DOCUMENTS

| | | | |
|---|---|---|---|
| 5,499,041 A | 3/1996 | Brandenburg et al. ...... 345/174 |
| 6,201,196 B1* | 3/2001 | Wergen ...................... 200/6 A |
| D447,740 S | 9/2001 | Johansson ................... D14/138 |
| 6,480,185 B1 | 11/2002 | Kiljander et al. ........... 345/167 |
| 6,623,194 B1* | 9/2003 | Lip ............................. 400/472 |
| 6,628,266 B1* | 9/2003 | Aguilar et al. .............. 345/161 |
| 6,920,041 B1* | 7/2005 | Oross et al. ................ 345/161 |
| 2003/0140713 A1* | 7/2003 | Ohsato et al. ......... 73/862.041 |
| 2003/0160761 A1* | 8/2003 | Wu ............................. 345/161 |
| 2005/0114796 A1* | 5/2005 | Bast ........................... 715/856 |

* cited by examiner

*Primary Examiner*—Richard Hjerpe
*Assistant Examiner*—Stephen G Sherman
(74) *Attorney, Agent, or Firm*—Harrington & Smith, LLP (57) ABSTRACT

An input system for an electronic apparatus including at least one force sensing element and a joystick member. The at least one force sensing element is connected to an underside of a printed wiring board (PWB) of the electronic apparatus. The at least one force sensing element includes a plurality of force sensing domes extending in a downward direction from the PWB. The joystick member extends through the PWB and contacts the force sensing domes. The joystick member has a user contact section located above an upper side of the PWB. The joystick member is adapted to be moved to depress the force sensing domes towards the PWB.

24 Claims, 5 Drawing Sheets

MOBILE TERMINAL WITH JOYSTICK

BACKGROUND OF THE INVENTION

1. Field of the Invention

The present invention relates to an input device for an electronic apparatus and, more particularly, to an input system having a joystick.

2. Brief Description of Prior Developments

Joysticks are commonly known in many different types of electronic devices, such as a computer game system controller or on a computer control console. U.S. Pat. No. 5,499,041 describes one type of joystick for use as a pointer on a laptop computer keyboard.

Radio telephone handsets have displays where text and graphics are displayed. A user can scroll through a menu or telephone numbers or even play games by use of arrow keys (up/down and/or left/right) on the handset. Another type of radio telephone handset interface has a roller that rolls along a single axis. U.S. Pat. No. 6,480,185 B1 describes a trackball type of input device for use in a portable radio telephone.

In addition to radio telephone handsets, there are also other types of communicator devices which use radio frequency and/or satellite transmissions. These communicators can include mobile terminals having a wireless communication function as well as features such as, for example, a camera, a PDA, or even a laptop computer with a radio telephone communications module. U.S. Pat. No. D447,740 S shows one type of communicator which has a general clamshell design with a radio telephone feature in a collapsed configuration and a keyboard and larger display available in an open configuration.

In the future, most communicators are expected to have some kind of a navigation device in them. A joystick is a common form of navigation device for many people and is commonly used. However, manufacturing of a joystick in a portable communicator, such as the communicator shown in U.S. Pat. No. D447,740 S has its limitations. More specifically, a joystick is relatively high and is not particularly adapted for use with a hand held communicator, such as a hand-held portable mobile terminal.

There is a desire to provide a joystick type of input device or navigation device in a portable mobile terminal which has a reduced height. There is also a desire to provide a joystick type of input device in a hand-held mobile radio telephone flip-open communicator which can be covered by a lid of the flip-open communicator when the communicator is in a collapsed configuration.

SUMMARY OF THE INVENTION

In accordance with one aspect of the present invention, an input system for an electronic apparatus is provided including at least one force sensing element and a joystick member. The at least one force sensing element is connected to an underside of a printed wiring board (PWB) of the electronic apparatus. The at least one force sensing element includes a plurality of force sensing domes extending in a downward direction from the PWB. The joystick member extends through the PWB and contacts the force sensing domes. The joystick member has a user contact section located above an upper side of the PWB. The joystick member is adapted to be moved to depress the force sensing domes towards the PWB.

In accordance with another aspect of the present invention, an electronic communicator input device is provided comprising a printed wiring board (PWB); a keypad connected to the PWB and located above a first side of the PWB; a force sensing element located below a second opposite side of the PWB; and a joystick member extending above the first side of the PWB and adapted to press against the force sensing element towards the bottom side of the PWB.

In accordance with one method of the present invention, a method of generating a signal from a user input device into a printed wiring board (PWB) of a portable electronic device is provided comprising steps of moving a joystick, the joystick having a user contact section located above a first side of the PWB; and applying force to a force sensing element located beneath an opposite second side of the PWB as the joystick is moved. The force sensing element is depressed towards the second side of the PWB as the joystick is moved to send the signal to the PWB.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
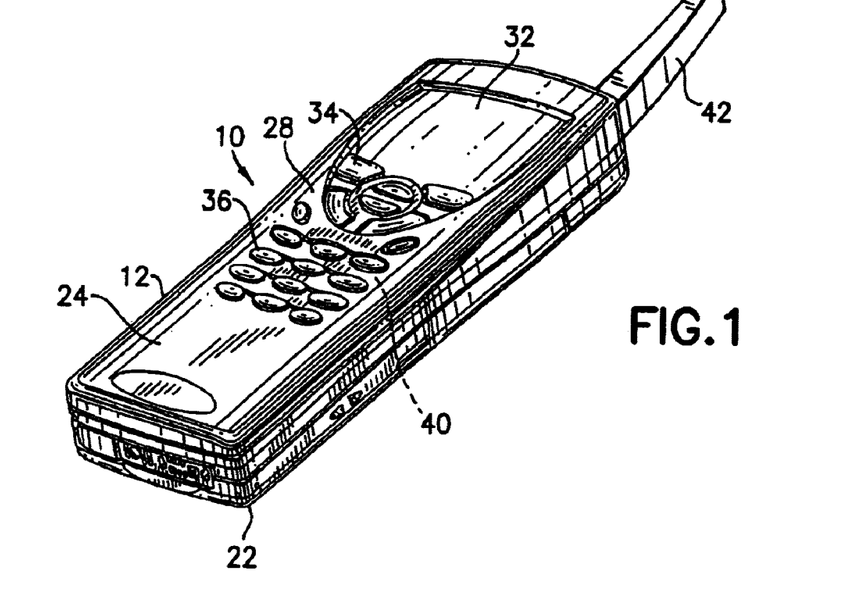
FIG. 1 is a perspective view of an electronic device incorporating features of the present invention.

Referring to FIG. 1, there is shown a perspective view of an electronic device 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

In the embodiment shown, the electronic device 10 generally comprises a mobile communicator, such as a mobile telephone. In alternate embodiments, the electronic device could comprise any suitable type of mobile communicator, such as a device which comprises a pager function or a text transmission function. The electronic device 10 could comprise any suitable type of features including, for example, a digital camera feature.

Figure 2:
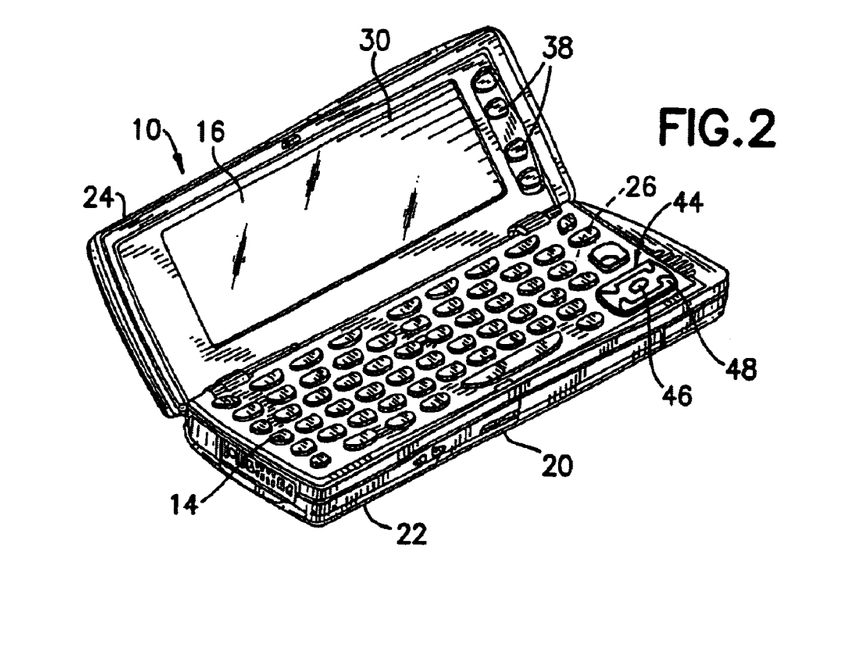
FIG. 2 is a perspective view of the electronic device shown in FIG. 1 with the clamshell housing moved to an open position.

Referring also to FIG. 2, the electronic device 10, in the embodiment shown, generally comprises a housing 12. The housing is configured in a general clamshell configuration to provide the electronic device with a first section 22 movably attached to a second section 24. In the embodiment shown, the first section 22 is pivotably attached to the second section 24. The connection between the first section 22 and the second section 24 allows the two housing sections to be configured in either a collapsed configuration as shown in FIG. 1 or an open configuration as shown in FIG. 2. This provides the general clamshell configuration. However, in alternate embodiments, features of the present invention could be used with housing members that are movably attached to each other in any suitable configuration.

The first housing section or base 22 generally comprises a keypad 14 having alphanumeric keys and various control keys. A rechargeable battery 20 is removably connected to the base 22. Located within the housing of the base 22 is a printed wiring board (PWB) 26 which attaches the keypad 14 to a first display 16 and other electronic components, such as a microprocessor and a memory, for example.

The second housing section or lid 24 generally comprises a top side 28 and a bottom side 30. The top side 28 generally comprises a display 32, control keys 34, and an alphanumeric keypad 36. The bottom side 30 comprises the display 16 and control buttons 38. The lid 24 includes the various electronic components such as a transceiver 40, an antenna 42, a printed wiring board, and other components such as those conventionally found in mobile telephones. When the lid 24 is in the collapsed position shown in FIG. 1, the electronic device 10 can be used as a mobile telephone. When the lid is moved to the open position shown in FIG. 2, the keypad 14 and display 16 can be used by the user to display and/or enter information, and perhaps to communicate over the Internet.

The base 22, in addition to control keys and keyboard keys of the keypad 14, also includes a control input section 44. The control input section 44 generally comprises a first section 46 and the second section 48. The second section 48 includes four scroll keys; left, right, up, down. The scroll keys can be used to move a cursor on the display, move or highlight menu items on the display, or move between pages on the display, such as is conventionally known in the art. In an alternate embodiment, any suitable type of second section 48 could be provided. For example, the second section could comprise less than four scroll keys. In another alternate embodiment, the second section 48 might not be provided.

The second section 48 generally surrounds the first section 46. However, in an alternate embodiment, the second section 48 could be spaced from the first section 46. The first section 46 is located at the front right corner of the top surface of the base 22. This allows a user to actuate the joystick of the first section 46 with his or her thumb while grasping the base 22 with the same hand, and without an unnatural extension of the user's thumb. In an alternate embodiment, the first section 46 could be located at the front left side of the top surface of the base. Alternatively, the first section 46 could be located at any suitable position on the base 22, or even on the lid 24. The electronic device 10 could also comprise two of the first sections 46; such as one at each front corner of the base.

Figure 3:
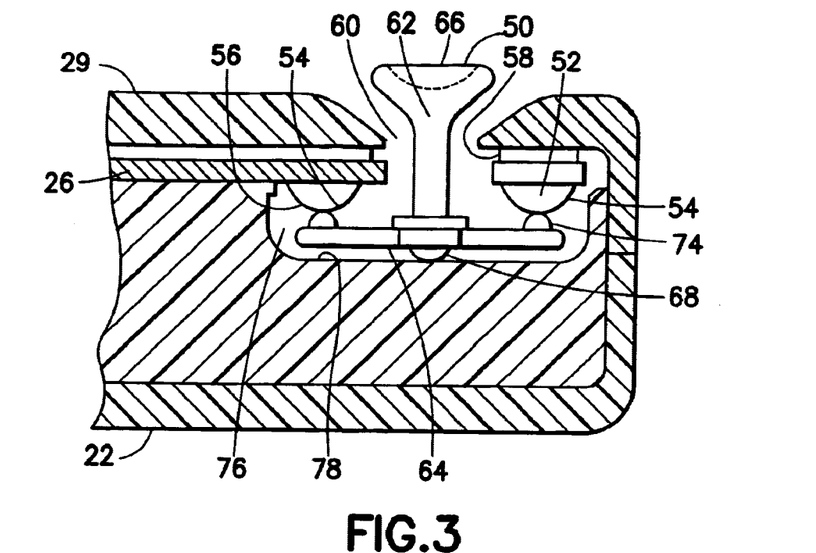
FIG. 3 is a partial cross sectional view of the joystick input system used in the electronic device shown in FIG. 2.
Figure 4:
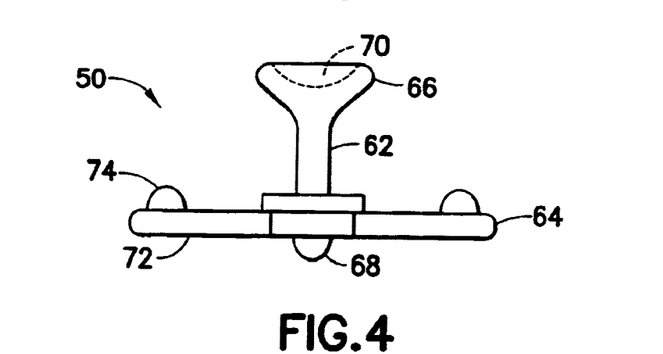
FIG. 4 is a side elevational view of the joystick member used in the joystick input system shown in FIG. 3.
Figure 5:
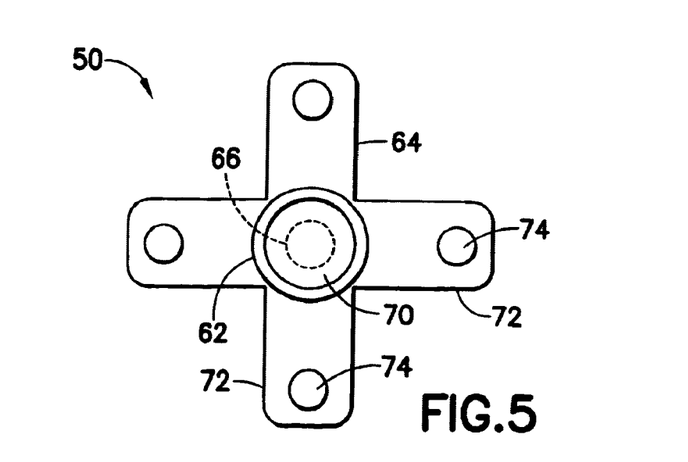
FIG. 5 is a top plan view of the joystick member shown in FIG. 4.

Referring also to FIGS. 3–5, the first section 46, in the embodiment shown, generally comprises a joystick member 50 and a force sensing element 52. The force sensing element 52 is connected to an underside or bottom side of the printed wiring board 26. The force sensing element comprises a plurality of force sensing domes 54. The domes 54 extend in a downward direction from the bottom side of the printed wiring board 26.

In the embodiment shown, the first section 46 of the control input system 44 comprises only one force sensing element. However, In alternate embodiments, the control input system could comprise more than one force sensing element. The force sensing element 52 comprises all four of the force sensing domes 54. In an alternate embodiment, the force sensing element could comprise more or less than four of the domes. In one type of embodiment, the control input system could comprise four force sensing elements with each force sensing element comprising only one force sensing dome.

The force sensing domes are preferably directly attached to the printed wiring board by adhesive. However, in alternate embodiments, any suitable system for attaching the force sensing domes or the force sensing element to the underside of the printed wiring board could be provided. The control input system preferably comprises a dome sheet 56 located along a bottom side of the domes. The dome sheet 56 is preferably comprised of resiliently deflectable plastic material. The dome sheet 56 helps to protect the domes 54 from wear by contact of the joystick member 50 against the domes 54.

The four force sensing domes 54 are arranged in an array with the domes being located 90 degrees apart from each other. The printed wiring board 26 comprises an aperture 58 therethrough. The domes 54 are aligned around the aperture 58. The top side of the base's housing also comprises an aperture 60. The two apertures 58, 60 are aligned with each other. The apertures 58, 60 are provided to allow a portion of the joystick member 50 to extend through the apertures.

Referring particularly to FIGS. 4 and 5, the joystick member 50 comprises a one-piece member comprised of molded plastic or polymer material. In an alternate embodiment, the joystick member could be comprised of multiple pieces and/or could be comprised of any suitable type of material(s). The joystick member 50 generally comprises a shaft 62 and a dome pusher 64. The shaft 62 includes a user contact section 66 and a pivot section 68. The user contact section 66 is located at a top end of the shaft 62. The pivot section 68 is located at a bottom end of the shaft 62. The user contact section 66 comprises a recess 70 for receiving a portion of the user's finger.

The dome pusher 64 extends laterally outward from the shaft 62 between the two opposite ends 66, 68. The dome pusher 64 comprises four generally cantilevered sections 72. The four sections are spaced about 90 degrees apart from each other to form a general X shape. In alternate embodiments, the dome pusher 64 could comprise any suitable shape, such as having more or less than four of the sections 72, or such as having the cantilevered sections orientated at any suitable angle relative to each other. In the embodiment shown, each cantilevered section 72 comprises an upwardly extending projection 74 proximate its distal tip.

Referring back to FIG. 3, the joystick member 50 is connected in the base 22 such that the shaft 62 extends through the apertures 58, 60 with the user contact section 66 being located at the top side 29 of the base and the dome pusher 64 being located in a receiving area 76 in the base 22. The pivot section 68 at the bottom of the shaft 62 is located against a surface 78 in the receiving area 76. Because the pivot section 68 has a general rounded shape, the shaft 62 is able to pivot on the surface 78 by a user moving the user contact section 66. The force sensing domes 54 are also located in the receiving area 76. More specifically, the force sensing domes 54 are located at the top side of the receiving area 76.

FIG. 3 shows the joystick member 50 at a home position. In this home position the projections 74 on the ends of the cantilevered sections 72 are located at the bottom apexes of the force sensing domes 54. The force sensing domes 54 help to keep the joystick member 50 biased at its home position. In an alternate embodiment, an additional biasing or locating system could be provided to maintain the joystick member 50 at its home position. The joystick member 50 is movable from its home position by a user pressing against the user contact section 66. The user contact section 66 is movable forward, rearward, right or left relative to the base 22. As the user contact section 66 is moved, the projections 74 on the cantilevered sections 72 can exert and release force against the force sensing domes.

The depression of the force sensing domes 54 occurs in a pattern reversed to manipulation of the user contact section 66. For example, when the user contact section 66 is pivoted forward, force is exerted against the rearward located dome 54 and force is released against the forward located dome. With the present invention, the force sensing domes 54 are depressed in an upward direction rather than a downward direction. Because the force sensing element 54 is directly attached to the printed wiring board 26, the control input system has a more compact height than previously available. However, in an alternate embodiment, the force sensing element 52 might not be directly attached to the printed wiring board. The overall height of the control input system is also reduced by merely having the pivot section 68 located on the surface 78. However, in an alternate embodiment, the pivotal connection of the joystick member to another component of the base 22 could comprise any suitable type of pivotable connection including, for example, a ball and socket connection.

Because the joystick member 50 extends through an aperture in the printed wiring board 26, the design described above has a much lower profile than previously provided in conventional devices. This is particularly useful for a handheld portable electronic device, such as a wireless communicator or a mobile telephone. The apertures 58, 60 are sufficiently large enough to allow full pivotably motion of the joystick shaft 62 therein. A movable dust shield or boot could be provided between the joystick shaft and the housing to prevent dust and debris from entering the receiving area 76.

In a preferred embodiment, the lid 24 comprises a small recess or pocket to receive a portion of the user contact section 66 therein. This pocket provides support for maintaining the user contact section 66 at its home position while the lid 24 is closed to prevent the joystick member 50 from moving while stored, such as in a user's pocket or bag. However, any suitable system for preventing the joystick member 50 from moving while the lid 24 is closed could be provided.

Figure 6:
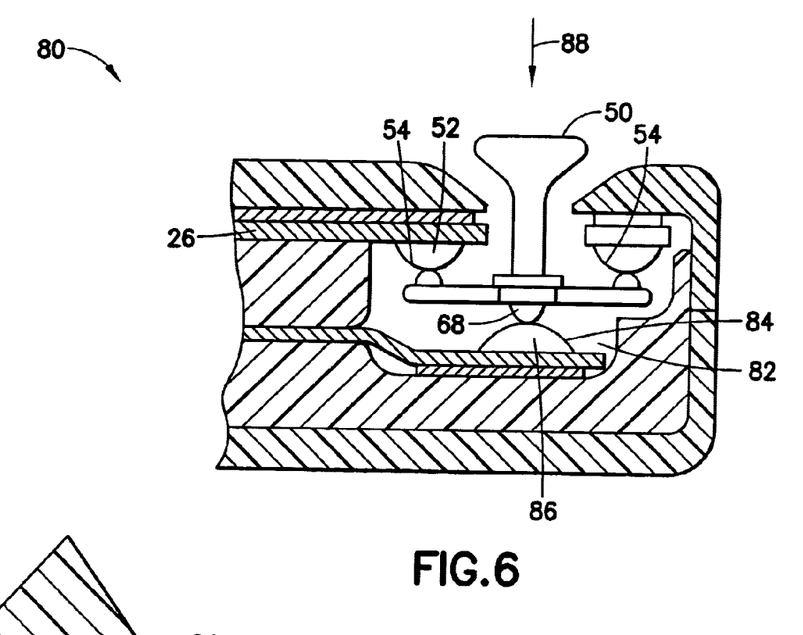
FIG. 6 is a cross sectional view of an alternate embodiment of the joystick input system.

Referring now to FIG. 6 an alternate embodiment of the present invention is shown. The control input system 80 generally comprises the same components as shown in FIG. 3. However, in this embodiment the system includes an enlarged receiving area 82 and an additional force sensing element 84 located beneath the joystick member 50. The additional force sensing element 84 comprises a single force sensing dome 86. The pivot section 68 of the joystick member 50 is located against the top surface of the force sensing dome 86. The joystick member 50 is adapted to be depressed in an inward direction, as indicated by arrow 88, to depress the force sensing dome 86. The force sensing dome 86 is adapted to bias the joystick member 50 back to its home position when released by the user. The rear of the force sensing dome 86 is supported by a component inside the base 22 or by the housing of the base. The force sensing element 84 is connected to the printed wiring board 26. This type of construction provides a five way joystick (forward, rearward, left, right and down).

Figure 7:
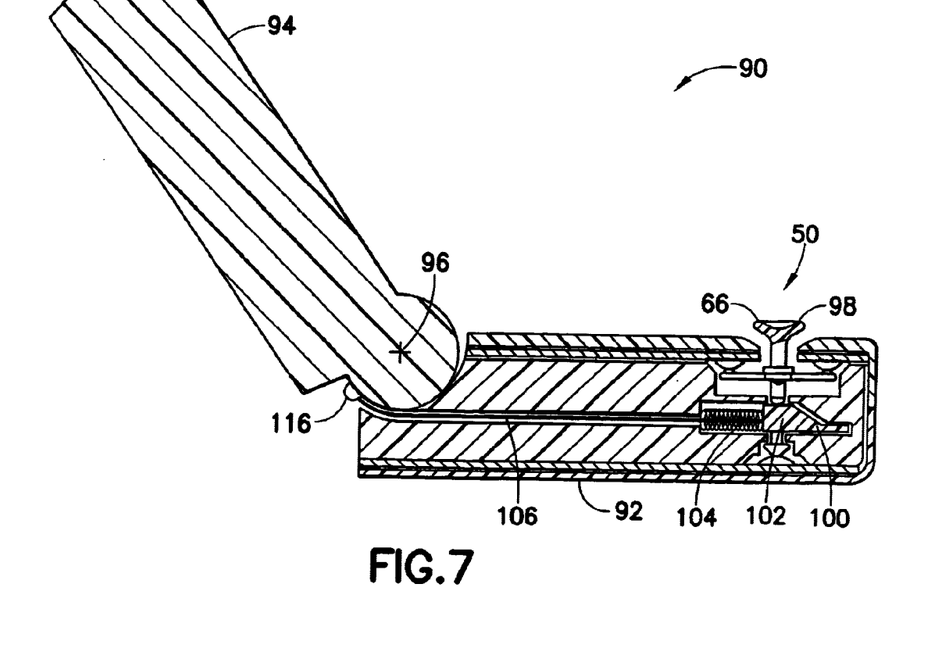
FIG. 7 is a schematic cross sectional view of another alternate embodiment of the joystick input system shown connected to housing members of an electronic device.
Figure 8:
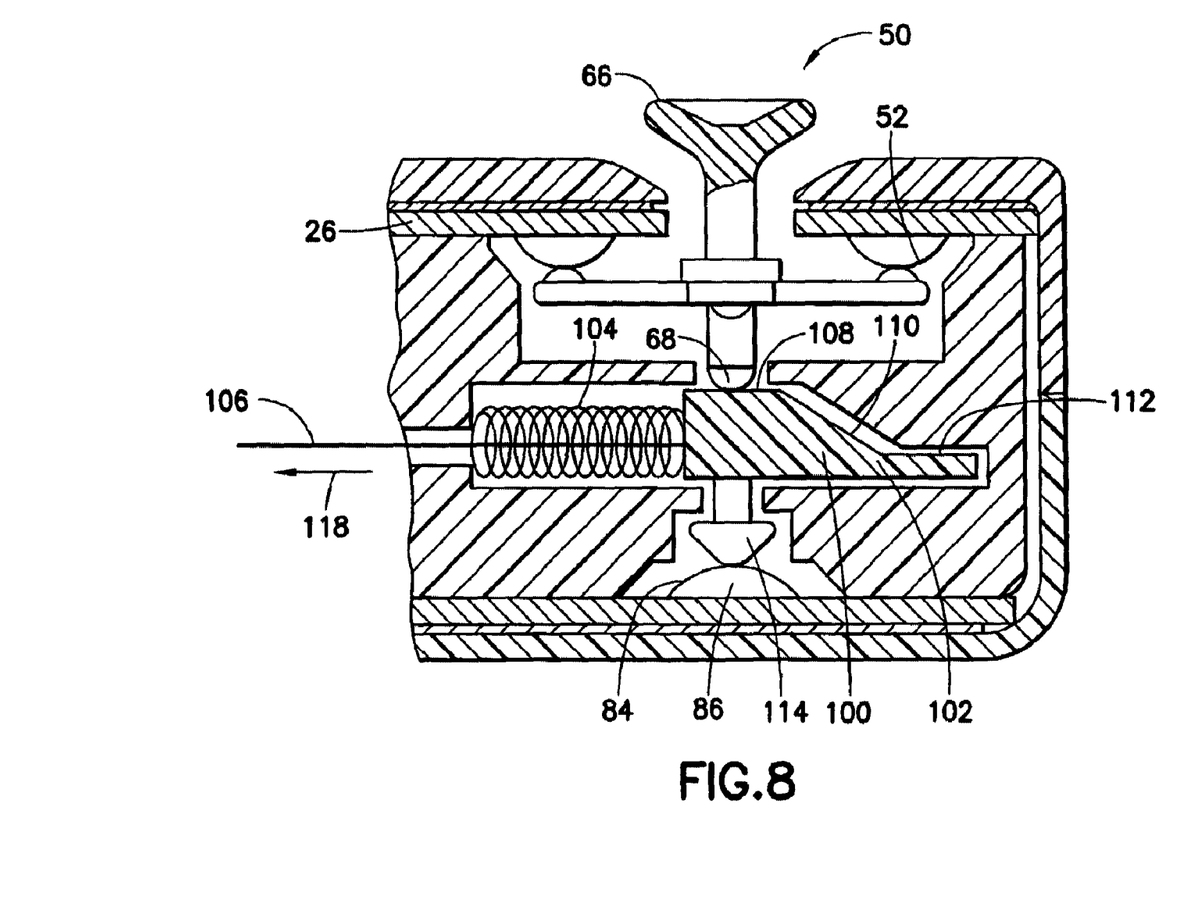
FIG. 8 is an enlarged cross sectional view of the joystick input system shown in FIG. 7.

Referring now to FIGS. 7 and 8, another alternate embodiment of the present invention is shown. The communicator 90 includes a base 92 and a lid 94. The lid 94 is pivotably connected to the base 92 at a pivot location 96. The control input system 98 includes the joystick member 50, the first force sensing element 52 (directly connected to the bottom side of the printed wiring board 26), the second force sensing element 84, and a system 100 for moving the joystick member 50 between an extended position and a retracted position relative to the housing of the base 92.

The extension/retraction system 100 generally comprises a wedge 102, a spring 104 and a pull member or tension member 106. The wedge 102 is located beneath the pivot section 68 of the joystick member 50. The wedge 102 comprises a pivot surface 108, a wedge surface 110, and a recess support surface 112. The control input system 98 also comprises a pusher 114 located between the bottom surface of the wedge 102 and the top surface of the force sensing dome 86 of the lower force sensing element 84. In an alternate embodiment, the pusher 114 could be integrally formed with the wedge 102.

FIG. 8 shows the joystick member 50 in an extended position. In this extended position the pivot section 68 is located against the pivot surface 108 of the wedge 102. When the joystick member 50 is depressed by a user, force is transmitted from the joystick member 50 through the wedge 102 and pusher 114 to the force sensing dome 86 of the force sensing element 84. The force sensing dome 86 is adapted to resiliently bias the pusher 114, wedge 102, and joystick member 50 back to their home positions shown in FIG. 8 when the joystick member 50 is released by the user.

The spring 104 biases the wedge 102 towards the home position shown. The pull member 106 has a rear end which is connected to the front end of the wedge 102, and a front end 116 which is connected to a portion of the lid 94. When the lid 94 is open relative to the base 92 as shown in FIG. 7, the spring 104 biases the wedge 102 at its home position to thereby locate the joystick member 50 at its extended position. When the lid 94 is moved relative to the base 92 to its collapsed position over the base, the pull member 106 is pulled in a direction as indicated by arrow 118. This moves the wedge 102 in the direction 118. The spring 104 is compressed. As the wedge 102 moves, the pivot surface 108 is moved away from the pivot section 68. The pivot section 68 is able to slide down the wedge surface 110 onto the recess support surface 112. The joystick member 50 is thus moved to a retracted position within the base 20. In one type of embodiment, the control input system could comprise a spring which biases the joystick member 50 towards the retracted position. Retraction of the joystick member 50 into the base 92 allows the lid 94 to be closed over the base 92 without hitting the user contact section 66 of the joystick member 50. Thus, the lower force sensing dome 86 is not automatically depressed when the lid 94 is closed.

When the lid 94 is moved back to its open position as shown in FIG. 7, the spring 104 biases the wedge 102 back towards its home position. As the wedge 102 moves forward, the wedge surface 110 wedges against the pivot section 68 to wedge the joystick member 50 back upwards towards its extended position. With the embodiment described above, the joystick member 50 is extended and retracted automatically based upon position of the lid 94 relative to the base 92. In an alternate embodiment, any suitable type of system for extending or retracting the joystick member 50 based upon position of housing sections relative to each other could be provided. In another alternate embodiment, extension and/or retraction of the joystick member 50 could be actuated by a switch or a lever on one of the housing sections. In the extended position the joystick member contacts the force sensing domes. In the retracted position the joystick member is spaced from all of the force sensing domes.

Figure 9:
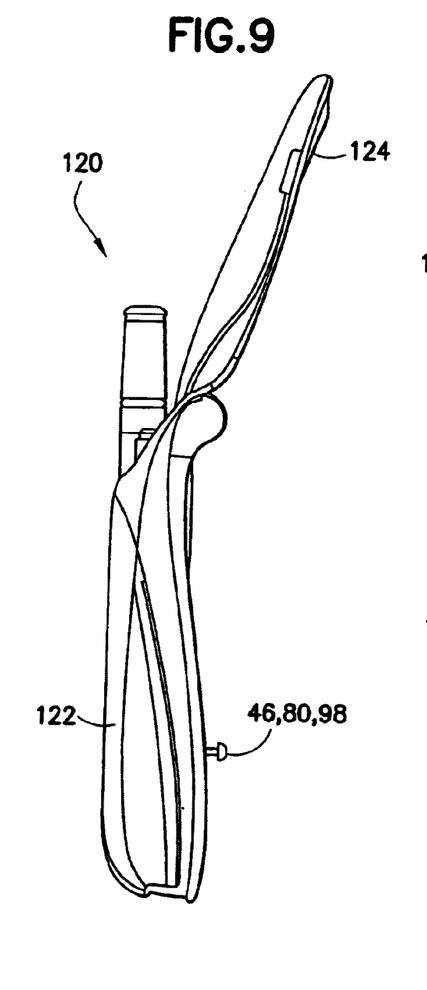
FIG. 9 is a side elevational view of a mobile telephone incorporating features of the present invention.
Figure 10:
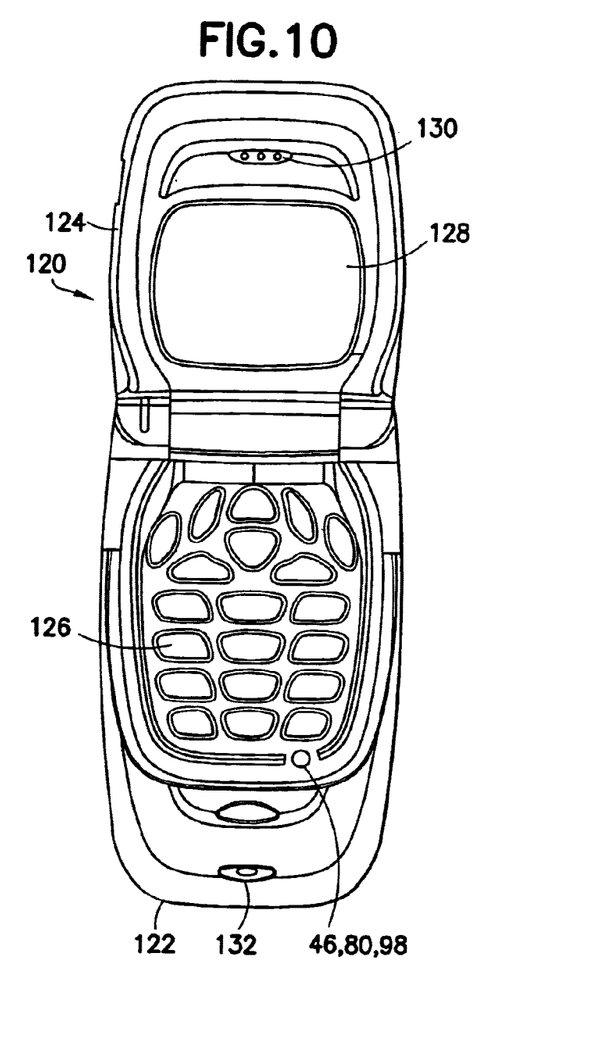
FIG. 10 is a front elevational view of the mobile telephone shown in FIG. 9.

Referring now to FIGS. 9 and 10, an alternate embodiment of the present invention is shown. In this embodiment the electronic device comprises a hand-held mobile telephone 120. The telephone 120 is a flip phone or clamshell type of phone which comprises a base 122 and a lid 124. The lid 124 is pivotably attached to the base 122 between an open position as shown, and a closed position with the lid covering the keypad 126 of the base 122. The lid 124 comprises a display 128 and a speaker or sound transducer 130. The base 122 includes the keypad 126, a microphone 132, and any one of the control input systems 46, 80, 98. This embodiment illustrates that the control input system using a joystick member can be incorporated into a relatively small hand-held mobile telephone, such as a flip-phone.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An input system for an electronic apparatus comprising:
   at least one force sensing element connected to an underside of a printed wiring board (PWB) of the electronic apparatus, the at least one force sensing element comprising a plurality of force sensing domes extending in a downward direction from the PWB, wherein the force sensing domes are adapted to be deformed in an upward direction; and
   a joystick member extending through the PWB and contacting the force sensing domes, the joystick member having a user contact section located above an upper side of the PWB,
   wherein the joystick member is adapted to be moved to depress the force sensing domes towards the PWB.

2. An input system as in claim 1 wherein the at least one force sensing element comprises a plurality of the force sensing elements, each force sensing element comprising only one of the force sensing domes.

3. An input system as in claim 1 wherein the force sensing domes are directly attached to the PWB by adhesive.

4. An input system as in claim 3 further comprising a dome sheet comprised of resiliently deflectable plastic material located along a bottom surface of the domes.

5. An input system as in claim 1 wherein the PWB comprises a hole therethrough and the joystick member extends through the hole.

6. An input system as in claim 1 wherein the joystick member comprises a joystick shaft and a dome pusher extending laterally from the shaft in a general cantilevered fashion.

7. An input system as in claim 6 wherein the joystick member is comprised of a one-piece member with the dome pusher being integrally formed with the joystick shaft.

8. An input system as in claim 6 wherein the dome pusher comprises a general X shaped member.

9. An input system as in claim 6 wherein a bottom end of the joystick shaft is pivotably located against a portion of the electronic apparatus.

10. An input system as in claim 6 further comprising another force sensing element located beneath the joystick shaft which is adapted to be depressed by a bottom end of the joystick shaft when a user depresses the joystick shaft.

11. An input system as in claim 1 further comprising a system for moving the joystick member between an extended position wherein the joystick member contacts the force sensing domes and a retracted position wherein the joystick member is spaced from all of the force sensing domes.

12. An input system as in claim 11 wherein the system for moving the joystick member comprises a wedge which contacts a bottom end of a joystick shaft of the joystick member.

13. An input system as in claim 12 further comprising a spring biasing the wedge at a predetermined position.

14. An input system as in claim 12 further comprising another force sensing element located beneath the wedge which is adapted to be depressed by the wedge as a bottom end of the joystick shaft depresses the wedge when a user depresses the joystick shaft.

15. A portable electronic communicator comprising:
   a housing having a first member and a second member movably connected to the first member;
   a transceiver located in the housing;
   an input system as in claim 12; and
   a system for automatically moving the wedge from a first position to a second position when the first member is moved relative to the second member.

16. A portable electronic communicator as in claim 15 wherein the first member comprises a housing base and the second member comprises a lid pivotably connected to the housing base.

17. A portable electronic communicator as in claim 16 wherein the system for moving the wedge comprises a pull member connected to the lid and a spring biasing the wedge at a home position.

18. A portable electronic communicator as in claim 17 wherein the portable electronic communicator comprises a mobile telephone.

19. An input system as in claim 1 wherein the force sensing domes are adapted to bias the joystick member away from the PWB.

20. An input system as in claim 1 wherein the force sensing domes are adapted to bias the joystick member at a home position.

21. An electronic communicator input device comprising:
   a printed wiring board (PWB);
   a keypad connected to the PWB and located above a first side of the PWB;
   a force sensing element located below a second opposite side of the PWB; and
   a joystick member extending above the first side of the PWB and adapted to press against the force sensing element towards the bottom side of the PWB,
   wherein the force sensing element comprises a deflectable force sensing dome adapted to be depressed in an upward direction by the joystick member.

22. An electronic communicator input device as in claim 21 wherein the force sensing dome is adapted to bias the joystick member away from the bottom side of the PWB.

23. An electronic communicator input device as in claim 21 wherein the force sensing dome is adapted to bias the joystick member at a home position.

24. A method of generating a signal from a user input device into a printed wiring board (PWB) of a portable electronic device, the method comprising steps of:
  moving a joystick, the joystick having a user contact section located above a first side of the PWB; and
  applying force to a force sensing element located beneath an opposite second side of the PWB as the joystick is moved, wherein the force sensing element is depressed towards the second side of the PWB as the joystick is moved to send the signal to the PWB,
  wherein the force sensing element comprises a deflectable force sensing dome adapted to be depressed in an upward direction by the joystick member and wherein the force sensing element at least partially biases the joystick towards a home position after the force is removed.

* * * * *